Feb. 2, 1960  G. B. BENANDER  2,923,912
ANGLE PLUGS AND METHOD OF ASSEMBLING SAME
Filed Oct. 29, 1956  2 Sheets-Sheet 1
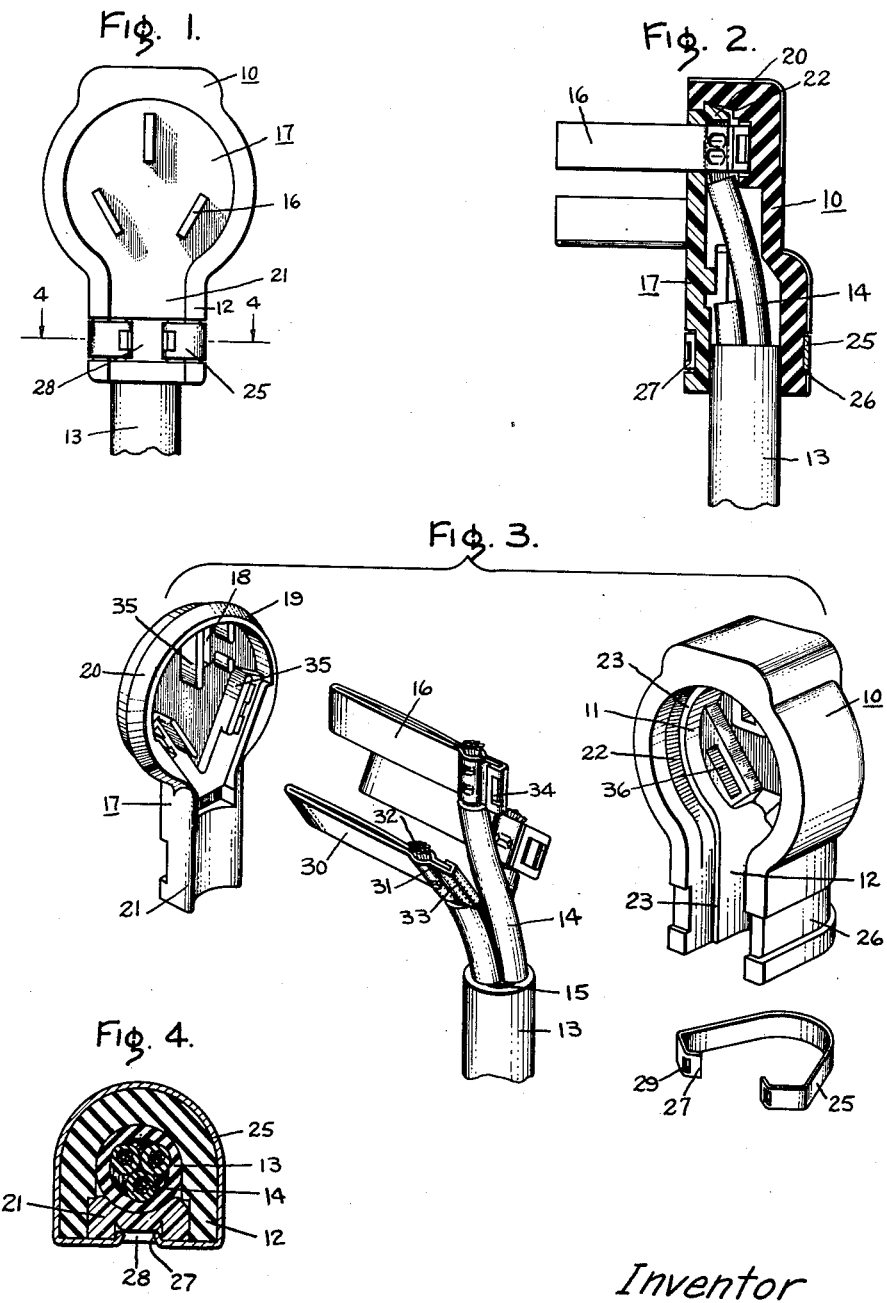
Inventor
George B. Benander
by Allard A. Braddock
His Attorney Feb. 2, 1960 G. B. BENANDER 2,923,912
ANGLE PLUGS AND METHOD OF ASSEMBLING SAME
Filed Oct. 29, 1956 2 Sheets-Sheet 2

Inventor:
George B. Benander
by Allard A. Braddock
His Attorney

United States Patent Office 2,923,912
Patented Feb. 2, 1960

2,923,912

ANGLE PLUGS AND METHOD OF ASSEMBLING SAME

George B. Benander, Providence, R.I., assignor to General Electric Company, a corporation of New York Application October 29, 1956, Serial No. 619,074

8 Claims. (Cl. 339—196)

This invention relates to an angle plug for an electrical cord and particularly to a three-wire plug that is used for connecting an electric range cord with a wall-mounted outlet. It has been common practice in the past to mold a solid plug on the end of a range cord, to form the plug of several preformed shapes which are held together on the cord by suitable screw fasteners, or to thread the cord through a side opening in an angle plug and then attach the contact blades to the wires of the cord, insert a disk over the blades and snap the disk into the main body of the plug.

The present invention represents improvements over all of the known prior art in that it allows the contact blades to be assembled to the conductors of the cord first. Then the blades are forced through slots in a disk or mounting plate that is later assembled in a recessed body member having a generally circular opening and an open throat portion. Finally, a metal strap is wrapped around the throat portion with its two ends hooked over opposite side walls of a depression in the mounting plate to hold the sides of the throat against the said plate. The improvement in this invention lies in the fact that it is very simple to assemble the parts into an improved angle plug that can be made at a reduced cost without sacrificing its reliability of operation.

This application is a continuation-in-part of my co-pending application, Serial No. 531,740, which was filed on August 31, 1955, and is now abandoned.

According to my invention, I have provided a prefabricated angle plug of insulating material formed with a thin mounting plate, a recessed body member, and a metal strap for holding the parts assembled. The body member is of recessed construction having a circular opening and an open throat portion, the latter serving to receive the cord therethrough. In the first modification of my invention the interior of the side walls of the circular opening is provided with a groove while the periphery of the circular portion of the complementary mounting plate has a tapered flange for mating engagement in the said groove. The second modification eliminates the flange and groove connection between the plate and body member and in its stead uses a pin and hole connection.

To assemble an angle plug according to the first modification of this invention, the contact blades are first crimped, welded, or otherwise attached on the ends of the conductors of the cord, and then the blades are sprung through slots formed in the mounting plate to be held therein. The flange of the mounting plate is then forced into the groove of the body member so that the cord extends outwardly of the plug through the throat portion. A metal strap is wrapped around the throat with the ends of the strap bent down into a depression in the mounting plate.

The second modification of the angle plug of this invention has a pin-like projection on one side of the plate which mates in a hole formed in the body member. The same metal strap is used in both designs to clamp the plate in the open throat of the body member.

The principal object of this invention is to provide an angle plug with the least number of parts where the contact blades are first attached to the conductors of an electrical cord and then supported in a mounting plate that is adapted to be fastened in the main body member of the plug, while a metal strap is used to hold the plug in an assembled condition.

A further object of this invention is to provide a novel strap for clamping an electrical cord in an angle plug.

A still further object of this invention is to provide an angle plug having a recessed body member and a mounting plate with a novel means for joining these parts together.

My invention will be better understood from the following description taken in connection with the accompanying drawings and its scope will be pointed out in the appended claims.

Figure 1 is a bottom plan view of an angle plug according to the first modification of my invention.

Figure 2 is a cross-sectional side view of the angle plug of Figure 1.

Figure 3 is an exploded view of the angle plug of Figure 1.

Figure 4 is a cross-sectional view on an enlarged scale taken on the lines 4—4 of Figure 1.

Figure 5:
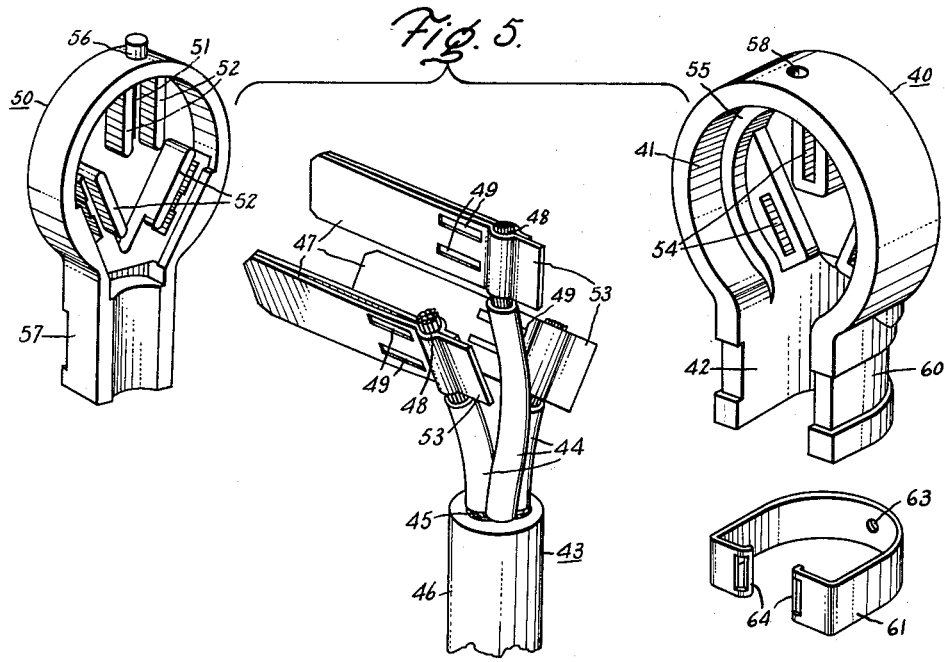
Figure 5 is an exploded view of the second modification of my invention.

Referring in detail to the drawing, and in particular to the first modification of Figure 3, 10 represents the main body portion of the plug of rubber or other suitable resilient insulating material, and it will be seen that it is recessed along one side with a generally circular opening 11 and an open throat portion 12 for receiving an electrical cord or cable 13 which is fed therethrough. The cable is shown as having a core of three insulated conductors 14 with jute fillers 15 in the interstices between the conductors, which are covered with a rubber or vinyl jacket. A contact blade 16 is fastened to the end of each conductor 14 to extend at right angles to its supporting conductor.

There is a mounting plate 17 of rigid insulating material such as molded phenolic or the like having a slotted opening 18 for each of the contact blades 16. This mounting plate 17 serves to support the contact blades in a fixed relation with respect to each other so that they will be in a position to be inserted into a suitable range outlet (not shown). The plate 17 is adapted to be fitted into the open face of the body member 10 and to be held therein so that the member 10 is, in effect, a housing to enclose the terminal ends of the contact blades 16. Plate 17 has a circular portion 19 with a peripheral flange 20 of tapered construction, and an extension 21 projecting radially from the circular portion 19 for closing the open throat 12 of the body member 10. A continuous groove 22 is formed along the interior of the side walls of the circular opening 11 for receiving the flange 20 of the mounting plate 17 as is best seen at the top of Figure 2 and in Figure 3. The groove 22 does not extend along the side walls of the throat 12 although the innermost ledge 23 of the groove is carried along into the throat. Thus, the ledges 23 on the opposite side walls of the throat 12 serve to support the extension 21 of the mounting plate 17. Since the side walls of the extension 21 are smooth, it will be appreciated that the plate 17 is held in the body member 10 by means of the mating engagement between the flange 20 and the groove 22.

To complete the assembly, a thin metal strap 25 is wrapped around the outer surface of the throat 12 to serve as both a strain relief means for the cable and a final assembly means for the plug. The strap 25 is seated in an undercut section 26 in the outer surface of the throat while its two ends 27 are bent down into a depression 28 in the outer face of the extension 21 of the mounting plate 17. This forms a tight holding force around the throat of the body member 10 so that the plug may not be disassembled unless the strap 25 is first pried loose with a suitable tool and removed from the plug. Cutouts 29 are made near the strap ends 27 to facilitate the bending of the strap into the depression 28 so that the ends 27 are, in effect, hooks which firmly engage the sides of the depression 28.

The contact blades 16 are made of thin strips of electrically conducting material doubled back to form a bowed shank portion 30, a terminal portion 31 which is crimped around a bare conductor 32 of the insulated conductors 14, and a rigid section 33 where one end of the blade is folded over the other. The folded-over end is provided with a cutout 34 similar to cutout 29 of the strap 25 to facilitate the bending of the blade. Studs 35 are formed on opposite sides of the slots 18 in the mounting plate 17 as is best seen in Figure 3 to brace the contact blades 16 against twisting or rocking motions in the slots. When the plug is assembled, the bowed shank 30 of the blades is tightly engaged in the slots 18 while the rigid end 33 of the blade is seated in complementary depressions 36 in the body member 10.

The steps necessary in assembling this plug are first to crimp the contact blades onto the insulated conductors 14 of the cable, as shown in Figure 3; then the blades 16 are sprung through the slots 18 in the mounting plate 17. Since the body member 10 is of resilient material, such as rubber, it is then possible to snap the flange 20 of the plate 17 into the circular opening 11 of the body and finally to locate the cord 13 in the throat 12 with the extension 21 of the plate 17 seated on the ledges 23 in the throat. Finally, the metal strap 25 is placed in the undercut section 26 of the throat and bent around and hooked into the depression 28 of the plate 17, as is seen in Figure 4. It is of importance that the extension 21 of the plate 17 not be fastened by means of mating flanges and grooves in the throat 12 for it would then be next to impossible to separate the plate 17 from the body 10. One advantage of the extension 21 of the plate 17 is that it provides a mechanical advantage necessary in removing the plate since it is, in effect, a lever arm which may be pried upwardly to disengage the flange 20 from the groove 22. If it were necessary to inspect the crimped connection between the contact blades and the cord, the only tool necessary would be a screw driver for prying the metal strap 25 from around the throat 12.

Turning now to a consideration of the second modification of Figure 5, there is a main body portion 40 of rubber or other suitable insulating material that is recessed along one side with a generally circular opening 41 and an open throat portion 42 for receiving the electrical cable or cord 43 therethrough. The cable core comprises three insulated conductors 44 with jute fillers 45 between the conductors and under the outer jacket 46 of the cable. Contact blades 47 of double-back construction are folded over the bare conductor as at 48 and welded thereto. Inwardly formed indentations 49 are made on both sides of the blades 47 near the welded connection 48; it being understood that the indentations on one side of a blade are off-set from the indentations on the other side of the same blade so that the central portion of each blade is bowed outwardly for reasons which will be understood later.

A mounting plate 50 of rigid insulating material is similar to the plate 17 of Figure 3. This plate has a series of three slotted openings 51 through which the contact blades 47 are thrust. The indented portions 49 of the blade are confined in the slots 51 so that there is relatively little movement of the contacts in the plate. Studs 52 are arranged at either side of each slot 51 to brace the contacts from moving in the slots. End extensions 53 are made on the contact blades to seat in close-fitting recesses 54 of the body member 40.

The plate 50 is adapted to fit into the open face of the body member 40 and rest on the ledge 55 that extends around the inner surface of the circular opening 41. A pin or stud 56 is molded on the side of the mounting plate 50 opposite an extension 57 of the plate 50 which fits into the open throat 42 of the body member. A hole 58 is made in the wall of the body 40 to receive the pin 56 of the mounting plate.

Figure 6:
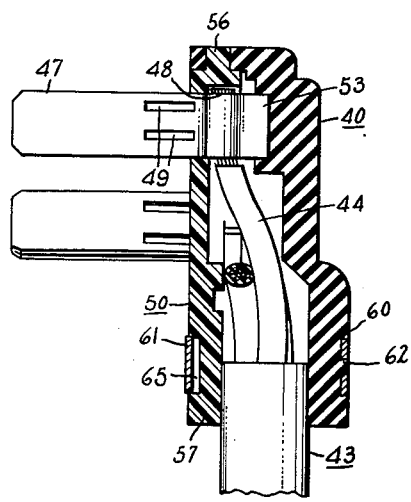
Figure 6 is a cross-sectional side view of the angle plug of Figure 5.

The outer surface of the throat portion 42 of the body 40 is undercut as at 60 so that a thin metal strap 61 may be placed in the undercut and wrapped around the throat of the body to clamp the extension 57 of the plate 50 firmly within the body 40 all in a manner similar to that shown in the first modification. One improvement is that a stud 62 shown in Figure 6 is molded in the undercut section 60 and on the back side of the body 40 to mate in an opening 63 of the metal strap to center the strap and provide a tighter clamping action when the two hook ends 64 of the strap are bent down into a depression 65 made in the plate. The stud 62 serves to prevent the strap from slipping around the throat when the ends of the strap are pulled in and around the throat. Hence, each arm of the strap acts independently of the other. The pull on one arm is not resisted by the other arm but, on the contrary, by the stud 62. Accordingly, a stronger clamping action can be obtained.

An improvement in the second modification over the first is that the flange and groove connection between the mounting plate and body member has been eliminated in favor of the pin and hole connection of the second modification. Hence, it is easier to mold the body member 40 and to assemble the plug by slipping the pin 56 of the plate 50 into the hole 58 of the body and forcing the plate 50 into the recessed opening of the body. Then the metal strap 61 is folded around the throat of the body to clamp the plate firmly in place.

Having described above my invention of novel prefabricated angle plugs having a minimum number of parts which are easy to mold and simple to assemble, it should be appreciated that the resulting product is of the highest quality and reliability. The reduced width of the throat serves as a strain relief since any pulling forces exerted on the cord will be transmitted to the mounting plate which cannot slide out through the narrow throat. I have endeavored to reduce the amount of compound needed to mold such angle plugs with a minimum amount of hardware needed to hold the different parts together. Simplicity is the keynote of this invention since it enables the manufacture of a better product at a lower cost.

Modifications of this invention will occur to those skilled in this art, and it is to be understood, therefore, that this invention is not limited to the particular embodiment disclosed but that it is intended to cover all modifications which are within the true spirit and scope of the claims of this invention.

What I claim as new and desire to secure by Letters Patent of the United States is:

1. An angle plug of insulating material comprising a resilient body member and a rigid mounting plate, said plate containing a plurality of slots supporting contact blades that extend therethrough, the body member being recessed with a generally circular opening along one side that communicates with an open throat portion, the mounting plate fitting snugly into the body member to serve as a cover for the circular opening and open throat, although leaving a cord-receiving opening in the throat of the body member with a cord confined therein having individual conductors connected to the inner ends of the said contact blades, means for fastening the mounting plate in the body member comprising a metal strap tightly clamped around the throat of the body member, and a pin and hole connection at the peripheral edge of the plate that is remote from the throat portion and being between the edge of the plate and a side of the body member.

2. An angle plug as recited in claim 1 wherein the said pin and hole connection is formed with the pin protruding from the side of the mounting plate as an integral part thereof and the hole being formed in an adjacent surface in the side of the body member.

3. An angle plug as recited in claim 2 wherein a ledge is formed in the body member around the sides of the circular opening which limits the inward movement of the mounting plate into the body member.

4. An angle plug as recited in claim 3 wherein the two ends of the metal strap are formed down into a depression in the plate, two of the opposite walls of the depression being substantially perpendicular to the outer surface of the mounting plate, whereby the strip ends are hooked over the edges of said opposite walls and prevent relative movement between the plate and the body member.

5. An angle plug as recited in claim 4 wherein the central portion of the metal strap has an opening which fits over an integral stud protruding from the body member.

6. An angle plug of insulating material comprising a rigid plate having slotted openings supporting a group of contact blades, a cable having insulated conductors joined to the ends of the contacts, and a recessed body member of resilient material fitting snugly over the said plate, the mounting plate having a large circular portion and a relatively narrow radial extension that overlies the cable where it enters the plug, a ledge formed on the inner surface of the body member to limit the entrance of the plate into the body member, the side edge of the circular portion of the mounting plate having locking means interfitting with the interior of the recessed body member and a metal strap fastened over the body member with the two ends of the strap formed down into a depression in the plate to engage the opposite side walls of such depression, so that there will be no relative movement between the plate and the body member.

7. An angle plug as claimed in claim 6 wherein the recessed body member has a groove formed on the interior of the side walls of the circular part thereof and the rigid mounting plate is formed with a flange for mating engagement in the said groove.

8. An angle plug as claimed in claim 7 wherein the body member groove and mounting plate flange are of circular configuration.

References Cited in the file of this patent

UNITED STATES PATENTS

| | | |
|---|---|---|
| 914,150 | Macomber | Mar. 2, 1909 |
| 989,223 | Bagley | Apr. 11, 1911 |
| 1,027,525 | Corn | May 28, 1912 |
| 1,954,252 | Maus | Apr. 10, 1934 |
| 2,027,853 | Benander | Jan. 14, 1936 |
| 2,162,544 | Benander | June 13, 1939 |
| 2,174,383 | Folsom | Sept. 26, 1939 |
| 2,224,547 | Ludwig | Dec. 10, 1940 |
| 2,475,243 | Irrgang | July 5, 1949 |
| 2,499,825 | Havlicek | Mar. 7, 1950 |
| 2,652,548 | Benander | Sept. 15, 1953 |